United States Patent [19]

Venetjoki

[11] Patent Number: 4,630,701

[45] Date of Patent: Dec. 23, 1986

[54] VEHICLE STEERING MECHANISM

[75] Inventor: Juhani T. Venetjoki, Helsinki, Finland

[73] Assignees: Lokari-Tuote Oy; Auto Lokari Oy, both of Metallitie, Finland

[21] Appl. No.: 715,793

[22] Filed: Mar. 25, 1985

[30] Foreign Application Priority Data

Apr. 6, 1984 [FI] Finland ................... 841372

[51] Int. Cl.[4] ........................................ B62D 3/12
[52] U.S. Cl. .................................... 180/209; 74/422; 180/906; 280/96
[58] Field of Search ................ 180/209, 906, 148; 74/422, 89.17; 280/96

[56] References Cited

U.S. PATENT DOCUMENTS

| 114,979 | 5/1871 | Sewell | 180/906 |
|---|---|---|---|
| 721,986 | 3/1903 | White | 280/96 |
| 2,788,858 | 4/1957 | Aasland et al. | 180/209 |
| 3,094,007 | 6/1963 | Luhrs | 74/422 |
| 3,154,164 | 10/1964 | Shaw et al. | 180/209 |
| 3,782,491 | 1/1974 | Herbenar | 180/906 |
| 4,359,123 | 11/1982 | Haupt et al. | 180/906 |

FOREIGN PATENT DOCUMENTS

| 1354158 | 1/1964 | France | 180/906 |
|---|---|---|---|
| 354639 | 8/1931 | United Kingdom | 280/96 |

Primary Examiner—John J. Love
Assistant Examiner—Kenneth R. Rice
Attorney, Agent, or Firm—Biebel, French & Nauman

[57] ABSTRACT

A vehicle steering mechanism is disclosed in which the axle bars can be locked at different distances from each other in order to adjust the track, and in which the effective length of the tie rod connecting the axle bars can be changed respectively. According to the invention the ends of the tie rod are articulated on opposite sides of the axle bars, and the tie rod is divided into two substantially parallel racks which are operationally connected to each other by means of a gear mounted between them by using bearings.

3 Claims, 2 Drawing Figures

U.S. Patent  Dec. 23, 1986  4,630,701
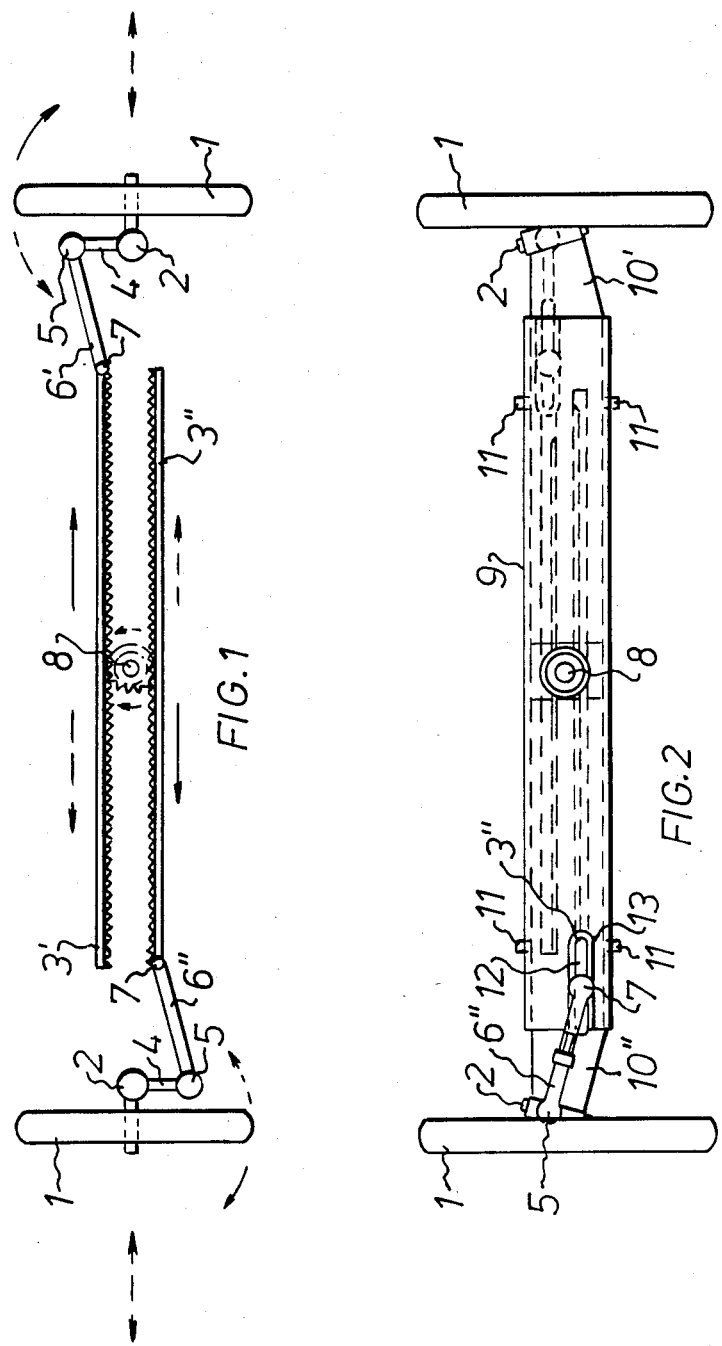

VEHICLE STEERING MECHANISM

BACKGROUND OF THE INVENTION

The present invention relates to a vehicle steering mechanism in which the axle bars can be locked at different distances from each other in order to adjust the track and in which the effective length of the tie rod connecting the axle bars can be changed correspondingly.

In many cases it would be advantageous and desirable for the track of a vehicle to be adjustable. It would be especially advantageous in farm tractors and garden tractors to adjust the track so that the wheels of the tractor would go into the furrows of a ploughed field or garden plot. In addition, it would be advantageous if the track could be adjusted to be maximal when driving on uneven terrain and, on the other hand, be reduced to minimal for the duration of transportation, for example when transporting a garden tractor on a trailer behind an automobile. In other respects it would also be advantageous if the track of a vehicle could be reduced temporarily, for example, when driving on narrow routes or when parking.

Numerous problems have been encountered so far in endeavors to create vehicle steering mechanisms with an adjustable track. When the distance between the axle bars has been changed in order to adjust the track, it has at the same time been necessary to adjust the length of the tie rod, in addition to which it has been necessary to readjust the steering angles. In order to produce a tie rod with an adjustable effective length, it has been necessary to make the tie rod from two parts which slide telescopically one inside the other and can be locked to each other. Such a structure is, however, relatively weak and easily bent by mechanical stresses and impacts it is subjected to.

Furthermore, the adjusting may be difficult to carry out, since the tie rod is exposed to soiling, and therefore the parts which slide one inside the other often stick to one another so that they become difficult or impossible to detach from each other. When a steering box is used, it is necessary to change the fastening point of the steering lever to the tie rod when adjusting the effective length of the tie rod. On the other hand, when worm and pin steering which acts directly on one axle bar is used, dead or nearly dead angles are easily produced if the track is spread too wide and the steering arm comes on the same straight line or nearly the same straight line as the axle of the wheel.

The previously proposed alternatives presented above also take up a great deal of space, they are complicated and function unreliably in practice. The object of the present invention is therefore to provide a vehicle steering mechanism in which the axle bars can be locked at different distances from each other in order to adjust the track and in which the effective length of the tie rod connecting the axle bars changes correspondingly without the steering angles having to be adjusted after the adjustment of the track. Furthermore, it is the object of the present invention to provide a vehicle steering mechanism which is more reliable in operation, easier to operate, and structurally simpler than previous ones, and the main characteristics of the invention are given in the accompanying claims.

SUMMARY OF THE INVENTION

Contrary to the previous known alternatives, in the steering mechanism according to the invention the ends of the tie rod are articulated to opposite sides of the axle bars, in which case the effective length of the tie rod changes not only when the track is adjusted but also when the wheels are turned. The tie rod is divided into two substantially parallel pinion racks, which are at a small distance from each other and operationally connected to each other by a gear mounted between them with bearings, the gear being preferably connected to the steering of the vehicle. In a manner deviating from normal rack-and-pinion steering, in the mechanism according to the present invention the steering forces are distributed evenly to two pinion racks which, when the gear is rotated, move in opposite directions, thereby causing the wheels to turn in the same direction since the opposite end of each rack is articulated to the tie-rod arm on the opposite side of the axle bar. The tie-rod arms of the two axle bars thus are in different directions. When the track is adjusted, the movement of one rack is automatically transmitted by the gear to the other rack as an equal movement in the opposite direction, and therefore it is not necessary to adjust the steering angles after the adjustment of the track.

In accordance with the present invention there is also provided a single-unit structure which fits in a very small space and is protected from soiling, by fitting the racks in a tubular shaft in which also the gear is mounted with bearings, there being at the opposite ends of the tubular shaft arms which slide telescopically over it or inside it and can be locked to the tubular shaft, the axle bars being mounted with bearings at the ends of the arms. The arms to be locked to the tubular shaft are preferably hollow so that the racks can be fitted inside them, the arms and respectively the tubular shaft having oblong openings or loops through which each rack is articulated to its axle bar.

The steering mechanism according to the invention is preferably fitted to the front axle of the vehicle, but it can also be fitted to the rear axle of the vehicle in order to provide four-wheel steering. Especially advantageously the steering mechanism according to the invention is fitted in a 2- or 4-wheel-drive tractor, for example a garden tractor having hydraulic power transmission.

DESCRIPTION OF THE DRAWING

FIG. 1 depicts a diagrammatic top view of one embodiment of the invention, and

FIG. 2 is a vertical representation of one preferred embodiment.

DESCRIPTION OF THE PREFERRED EMBODIMENTS

As seen in the diagram of FIG. 1, the steering mechanism according to the invention differs from the conventional rack-and-pinion steering mechanism in that the tie rod has been divided into two parallel, and in the case depicted in FIG. 1 successive, racks 3' and 3", which have by mediation of an articulation 7 and an arm 6' or 6" each been connected by means of an articulation 5 to the tierod arm 4 of its own axle bar 2. In this context, by 'tie rod' is meant an entity which is made up of racks 3' and 3", and of arms 6' and 6" connected to them by means of an articulation 7, the arms for their part being connected by means of an articulation 5 to the tie-rod arms 4 of the axle bars 2. By 'axle bar' 2 is meant in this context a king pin or swivel pin.

As can be seen in greater detail in FIG. 1, between the parallel, successive racks 3' and 3" there is mounted by means of bearings a gear 8, which either is connected to the steering rod or is freely rotating. If the gear 8 is freely rotating, the steering rod is, in some manner known per se, for example by means of a gear box, connected to either rack 3' or 3". The gear 8 fitted between the racks 3' and 3" has the effect that the rotating of the gear 8 causes an equal motion in opposite directions in racks 3' and 3", or respectively the motion of one rack 3' or 3" is transmitted by gear 8 to the other rack 3" or 3' as an equal motion in the opposite direction. Because of this, and since the tie-rod arms 4 of the axle bars 2 are in opposite directions, the wheels 1 turn an equal amount in the direction (curved arrows in figure) in which the steering wheel is turned.

For adjusting the track, the axle bars 2 are detached from their fastenings and taken axially an equal distance either away from or towards one another. At this time the vehicle is raised to such a degree that the wheels 1 are detached from the ground. The steering angles remain unchanged in spite of the adjustment of the track. The fastening of the axle bars 2 is preferably stepped, the stepping on each side of the vehicle being preferably at the same distance from the center line of the vehicle.

In the preferred embodiment depicted in FIG. 2, the steering mechanism is encapsulated in a tubular shaft 9 having a square cross section; arms 10' and 10", having substantially the same cross section, have been fitted telescopically at the opposite ends of the shaft 9 and locked to it by means of bolts 11. The axle bars 2 are also mounted using bearings at the free ends of these arms 10' and 10". Arms 10' and 10" are also hollow. The pinion gear 8, rotatable about a substantially horizontal axis, is mounted using bearings in the middle of the tubular shaft 9, and racks 3' and 3", equipped with corresponding toothing, are fitted inside the tubular shaft 9 in such a way that they also slide inside the hollow arms 10' and 10". The axle bars 2 are articulated by means of arms 6' and 6" to the rack 3' or 3" inside the tubular shaft 9 and arms 10' and 10", the articulation 7 of the rack 3' and 3" being fitted to move laterally on a horizontal plane reciprocally in an oblong loop 12 and in the opening 13 at the corresponding point in the tubular shaft 9.

In the embodiment depicted in FIG. 2, racks 3' and 3" are one above the other, but, nevertheless, they have been arranged to act on the opposite-directioned tie-rod arms 4 of the axle bars 2, located on the front and rear sides of the tubular shaft 9. The length of the arm 6" and possibly of the arm 6' can be adjusted in a manner known per se, in order to adjust the steering angles at the installation stage. However, in the system according to the present invention the adjustment of the track does not require the adjustment of the steering angles, when the two axle bars 2 are moved an equal amount in opposite directions, the racks 3' and 3" being moved respectively an equal amount in opposite directions by transmission of the gear 8 rotating freely between them. If the axle bars 2 are not moved an equal amount in opposite directions, the steering angles can, however, be retained by turning each wheel to one of its extreme positions and by keeping them in this position until the axle bars 2 have been locked in place.

What is claimed is:

1. A vehicle steering mechanism in which a pair of king pins are mounted on the vehicle, with means for positioning said king pins at differing axial distances from each other to adjust the track of the vehicle, the improvement comprising:
    a forwardly extending control arm connected to one of said king pins,
    a rearwardly extending control arm connected to the other of said king pins,
    a pair of articulating links, one each connected to each of said control arms, and
    a tie rod mechanism connected between said articulating links, said tie rod mechanism comprising:
    a first transversely extending rack having a free end and a connecting end, means connecting said connecting end to one of said articulating links, a second transversely extending rack having a free end and a connecting end, means mounting said second rack in parallel juxtaposition to said first rack, means connecting said connecting end of said second rod to the other of said articulating links,
    a steering gear, means mounting said steering gear between said racks in mutual engagement with each of said racks so that rotation of said gear is translated uniformly to cause simultaneous opposite movement of each of said racks.

2. A steering mechanism according to claim 1 fitted to both the front and the rear axle of the vehicle.

3. The steering mechanism of claim 1 further comprising a tubular shaft extending transversely of the vehicle, said king pin mounting means comprising arms telescopically received with resect to said tubular shaft, said racks being received longitudinally within the interior of said tubular shaft, said gear mounting means including said tubular shaft, means in said tubular shaft defining oppositely extending oblong openings, one each of said articulating links connected to the associated said rack through one of said oblong openings.

* * * * *